Oct. 18, 1949.     S. A. SCHLAGS     2,485,322
CLOTHESLINE SUPPORT
Filed Dec. 8, 1947
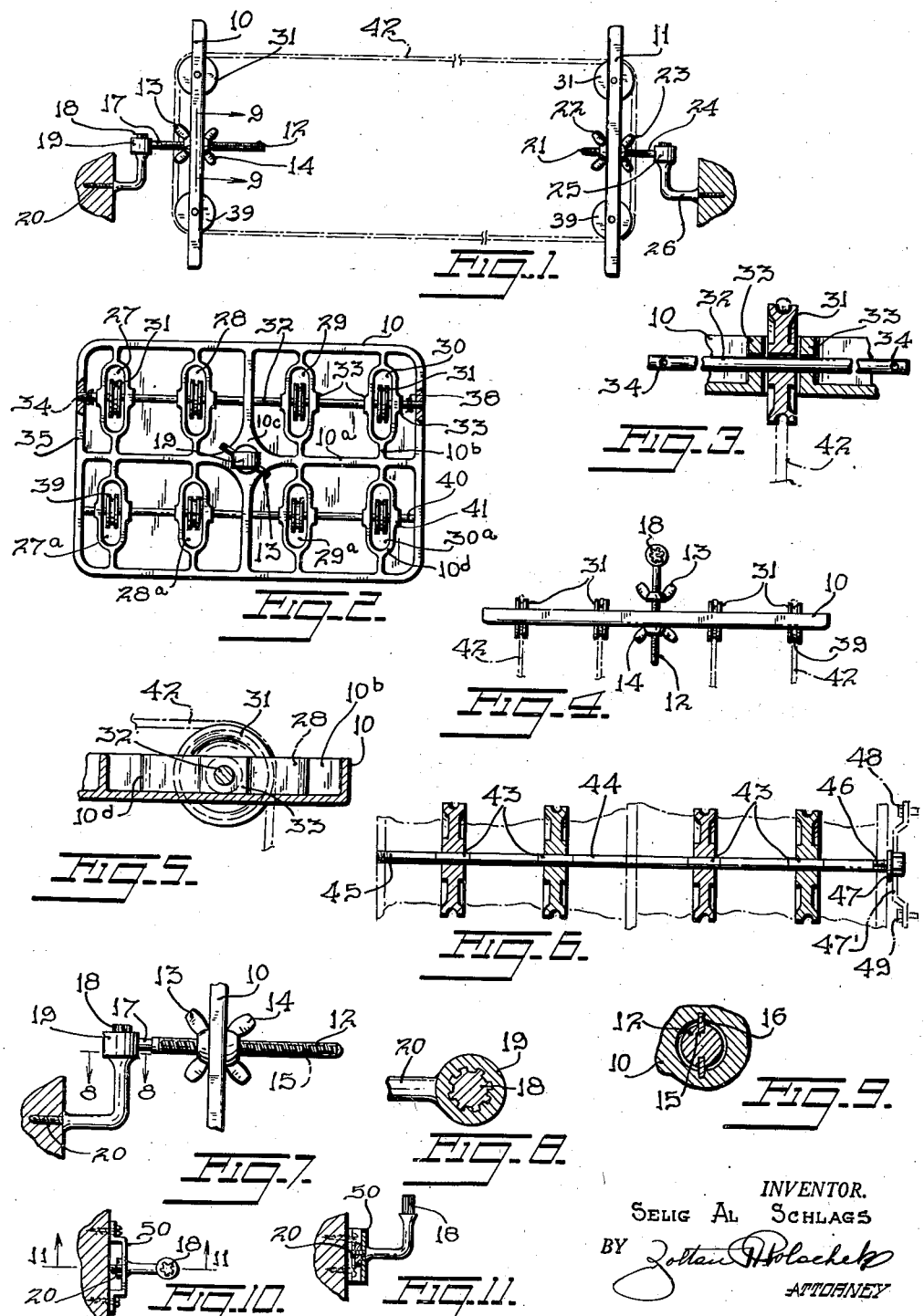
INVENTOR.
SELIG AL SCHLAGS Patented Oct. 18, 1949

2,485,322

UNITED STATES PATENT OFFICE 2,485,322

CLOTHESLINE SUPPORT

Selig Al Schlags, Brooklyn, N. Y.

Application December 8, 1947, Serial No. 790,295

6 Claims. (Cl. 211—119.10)

This invention relates to an improved support for multiple clotheslines for use in congested housing districts to provide enough clothesline holding capacity for the average family.

One of the objects of the invention is to provide a bearing plate with a plurality of individual pulleys mounted to turn upon a single supporting shaft in slots formed in the bearing plate and means for securing the shaft in place for easy removal.

Another object of the invention is to provide an improved hanger bolt upon which the bearing plate may be supported for easy vertical detachment.

A further object of the invention is to provide a tension regulating bolt which is keyed to the bearing plate to prevent rocking of the bearing plate on the bolt and to insure proper mounting of the opposing bearing plates and easy loading and unloading of the clotheslines supported thereby.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevation showing the companion bearing plates of a multiple family clothesline supported in place, the clotheslines being shown broken away for convenience of illustration.

Fig. 2 is a front elevation of one of the bearing plates, showing the receiving slots for the pulleys and the shaft supports therefor.

Fig. 3 is a detail longitudinal sectional view through one of the pulleys and its bearings.

Fig. 4 is an edge view of one of the bearing plates.

Fig. 5 is a fragmentary sectional view through the bearing plate, showing the stiffening ribs thereof.

Fig. 6 is a longitudinal sectional view showing a modified construction of the pulley supporting shaft.

Fig. 7 is a detail side elevation of one of the stationary bolt supports and the tension bolt connected thereto.

Fig. 8 is a detail cross sectional view, enlarged, through the stationary wall bolt and the enclosed stem of the tension bolt, taken on line 8—8 of Fig. 7, looking in the direction of the arrows.

Fig. 9 is a fragmentary sectional view, taken on line 9—9 of Fig. 1, looking in the direction of the arrows, showing the keys and keyways for preventing the bearing plates from turning on the supporting wall bolts.

Fig. 10 is a fragmentary horizontal detail view showing a modified attachment of bolt 20.

Fig. 11 is a vertical sectional view taken on the line 11—11 of Fig. 10.

Referring to the drawing, which illustrates the practical embodiments of the invention, 10 designates one bearing plate and 11 the opposing bearing plate, both of which are substantially identical with each other.

The plate 10 is adjustably supported on the tension bolt 12, by means of the wing nuts 13 and 14 threaded on this tension bolt against opposite sides of the plate 10.

The bolt 12 is formed with a plurality of longitudinal keyways 15, which are engaged by the steel keys 16 secured in the plate 10, which is preferably a casting of suitable metal. The plate is thus held against rotation on the shank of the bolt 12.

The bolt is formed with an integral lateral arm 17, which is provided with a socket 19 formed with internal ribs or corrugations. An L-shape flange bolt 20 is secured by screw threads or otherwise to a building wall or other vertical support. The free upper end of the L-shaped bolt is provided with an enlarged head 18 formed with corresponding vertical corrugations or ribs to interlock with the corresponding internal ribs or corrugations formed in the wall of the socket 19. By lifting the lateral arm 17 with the vertically disposed socket 19, the bolt 12 may be detached from the wall, and the bearing plate 10 may be moved to an interior position or stored away.

The bearing plate 11 is supported by means of a tension bolt 21 on a wall or pole either opposite to the building wall or at an angle thereto, at a point remote from the location of the bolt 20, and is clamped to the bolt 21 by means of the wing nuts 22 and 23, threaded on said bolt 21. The bolt 21 is provided with a lateral arm 24, which is integral with the socket 25 and is adapted to be keyed to a fixed bolt 26, secured to the distant pole or other support. The socket 25 and the upper free end of the fixed bolt 26 are provided with interlocking corrugations or ribs to prevent relative turning.

Each plate is formed with a row of four vertical slots 27, 28, 29 and 30, disposed in a line parallel to one side edge of the plate, and a row of vertical slots 27a, 28a, 29a, and 30a, disposed directly under the slots named and parallel to the opposite edge of the plate. In each of the slots 27, 28, 29 and 30, a free turning grooved pulley wheel 31 is disposed, to rotate on a shaft 32, which extends through bearings 33 on the sides of the slots. Each end of this shaft is placed in the side flange 35 of the plate, and is provided with holes 34 in which cotter pins 38 are placed to prevent the shaft from sliding.

Each plate is further provided with pulleys 39 located in each of the slots 27$^a$, 28$^a$, 29$^a$ and 30$^a$. A single shaft 40 extends through all of the pulleys of this series, and through bearings 41 on the sides of the slots, is similarly constructed as the shaft 32, and is similarly secured in place in the plate.

The slots are slightly wider than the pulleys received by them, so that no resistance to the rotation of the pulleys will be offered by the walls of the slots. The pulleys have diameters greater than the thickness of the plate which carries them. The plates 10 and 11 are supported in working levels are in a common horizontal plane, as near as may be established, so that a clothesline 42 may be trained over each pair of opposed pulleys, and thus four separate and independent clotheslines operate between the opposing plates 10 and 11.

When it is desired to adjust the tension of the four clotheslines 42, the wing nuts 13 and 14 are adjusted on the tension bolt 12, and while this is being done, the keyed connection of the bolt 12 with the bearing plate 10 will prevent relative rotation of the plate 10 on the tension bolt 12. It is understood that the clotheslines will be cut to sizes which will permit of simultaneous adjustment of all clotheslines by the adjustment of the plate 10 on the tension bolt 12, as described.

In order to simultaneously take up wear of the hub bearings of the pulleys on their supporting shafts, each of the shafts is provided with a tapered portion 43, shown in Fig. 6, which has a bearing in the hub which is formed with a matching taper. The shaft 44 is adjusted longitudinally by means of the screw-threaded end 45, and is turned by means of the hexagonal or square head 46, the washers 47 being used to prevent longitudinal shifting when an adjustment is made.

Each attaching bolt may be secured in place by means of a bracket plate 47', which may be secured to the wall or other fixed vertical support by means of end bolts 48 and 49.

By means of this improved clothesline supporting means, a single family may easily provide itself with a plurality of separate clotheslines, the length of each line being governed by the distance between the supports for the pulley plates.

Each plate is formed with a longitudinal internal stiffening rib 10$^a$, and a transverse stiffening rib 10$^b$ integral therewith, and with an integral box-like rib 10$^c$ located at the approximate center of the plate. Each slot is reinforced by means of an integral loop flange 10$^d$ through which the supporting shafts extend.

In Figs. 10 and 11 an indoor bracket 50 is shown to be provided for supporting the L-shape flanged bolt 20 by a complementary threaded nut. In other respects this form of the invention is similar to the previous forms.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. Means for supporting a plurality of independently usable clotheslines from a single building opening, comprising a spaced pair of plates having slots adapted to receive pulleys, parallel rows of pulleys mounted in the slots on an axle on each plate, means for attaching one of the plates to a vertical support remote from the building opening, a bolt attachable to the building and provided with a head having external ribs, and a bolt adjustable on the other plate and having a lateral arm provided with a socket and matching internal ribs engaging the ribs of said head.

2. Means for supporting a plurality of independent clotheslines upon stationary supports, comprising a spaced pair of plates, each plate having a series of vertical slots disposed in an upper horizontal row and a series of vertical slots disposed in a lower horizontal row, a shaft extending across each series of slots and supported on the plate, pulleys on said shafts within said slots and over which said clotheslines extend, means for supporting one of the plates against pivotal movement thereon, an attaching bolt for the other plate formed with a vertical socket, a head interlocked in said socket and removable vertically therefrom, a bolt extending from said head, and extending through the other plate, means for keying said other plate to said bolt against relative pivotal movement, and means for adjustably clamping the plate to said bolt.

3. A pulley plate for clotheslines, comprising a plate having side flanges and reinforcing ribs between the flanges, said plate being formed with a series of parallel slots, pulleys disposed in said slots, a shaft extending through all of the pulleys and having one end threaded into the plate, and a bolt for adjusting the tension of clotheslines engaging said pulleys, said bolt extending through said plate and having key means to prevent relative turning movement, nuts threaded on said bolt against opposite sides of the plate to clamp said bolt against longitudinal adjustment on said plate, a socket on said bolt disposed at right angles thereto, and an attaching bolt having a head which receives said socket.

4. A pulley plate for clotheslines, comprising a plate having side flanges and reinforcing ribs between the flanges, said plate being formed with a series of parallel slots, pulleys disposed in said slots, a shaft extending through all of the pulleys and having one end threaded into the plate, a bolt for adjusting the tension of clotheslines engaging said pulleys, said bolt extending through said plate and having key means to prevent relative turning movement, nuts threaded on said bolt against opposite sides of the plate to clamp said bolt against longitudinal adjustment on said plate, a socket on said bolt disposed at right angles thereto, and an attaching bolt having a head which receives said socket, the socket being formed with internal ribs and the head being formed with external ribs which interlock with each other to prevent turning of the head in the socket.

5. A support for clotheslines, comprising a plate having means rotatively supporting pulleys over which clotheslines are adapted to extend and formed with a hole, a bolt having one end slidably extended through said hole, nuts threaded on said bolt and against opposite sides of said plate for holding said plate in various longitudinally adjusted positions on said bolt to vary the tension of the clothesline, a socket formed on the other end of said bolt, an attaching bolt secured to a fixed support and formed with a head upon which said socket is engaged, and interlocking means on said socket and head for retaining said socket against rotation about said head.

6. A support for clotheslines, comprising a plate having means rotatively supporting pulleys over which clotheslines are adapted to extend and formed with a hole, a bolt having one end slidably extended through said hole, nuts threaded on said bolt and against opposite sides of said plate for holding said plate in various longitudinally adjusted positions on said bolt to vary the tension of the clothesline, a socket formed on the other end of said bolt, an attaching bolt secured to a fixed support and formed with a head upon which said socket is engaged, and interlocking means on said socket and head for retaining said socket against rotation about said head, and means for retaining said plate against rotative movement relative to said bolt while leaving said plate free to slide longitudinally on said bolt as said nuts are adjusted.

SELIG AL SCHLAGS.

REFERENCES CITED

The following references are of record in the file of this patent:

UNITED STATES PATENTS

| Number | Name | Date |
| --- | --- | --- |
| 499,323 | Hoit | June 13, 1893 |
| 652,794 | Lowe | July 3, 1900 |
| 887,358 | Swortfiger | May 12, 1908 |
| 1,337,341 | Brink | Apr. 20, 1920 |
| 1,670,215 | Rutland | May 15, 1928 |
| 1,766,624 | Frohmann | June 24, 1930 |
| 2,195,540 | Owens | Apr. 2, 1940 |
| 2,336,914 | Anderson | Dec. 14, 1943 |
| 2,370,944 | Emerson | Mar. 6, 1945 |